UNITED STATES PATENT OFFICE.

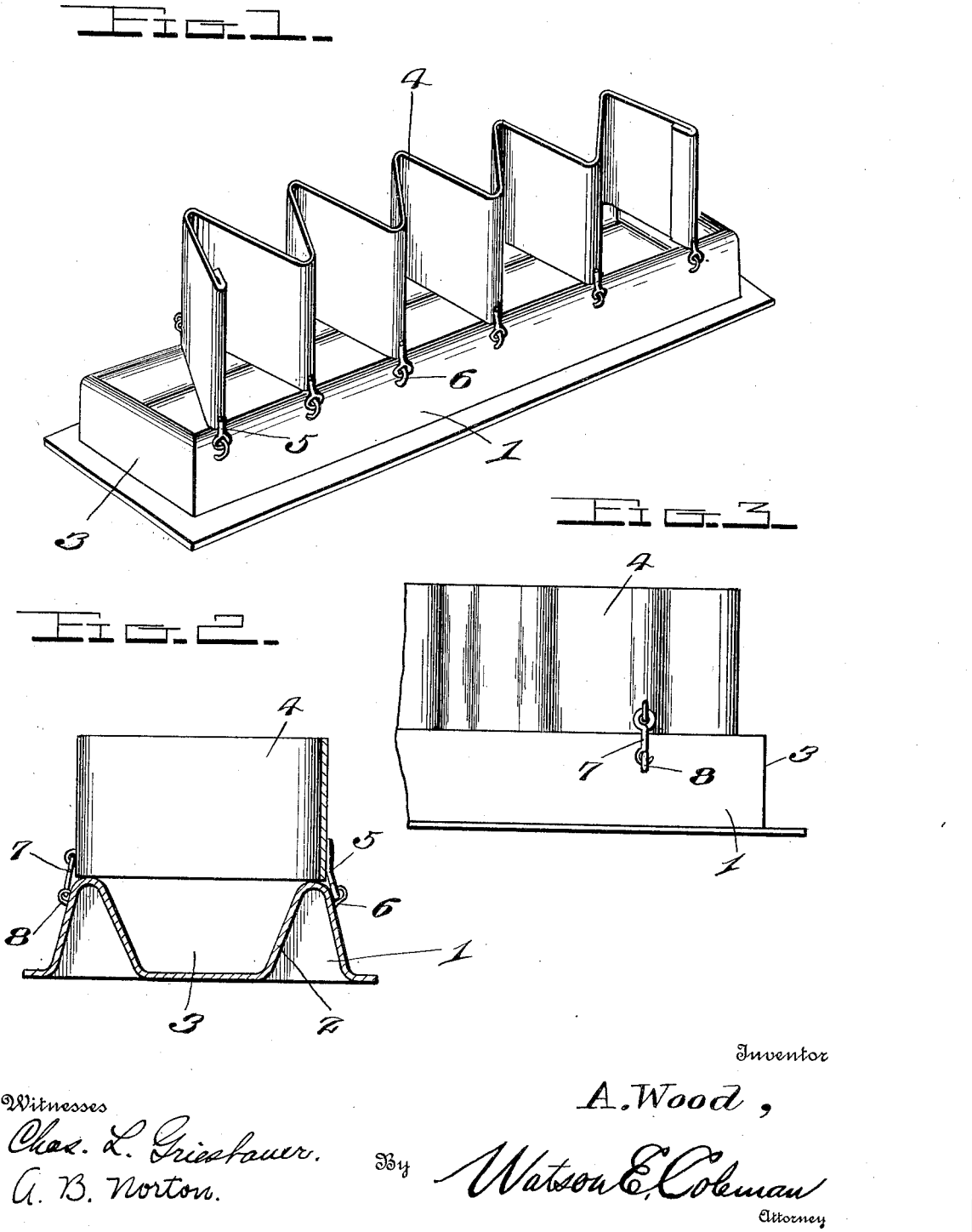

ASAPH WOOD, OF WHITTIER, IOWA.

FEED-TROUGH.

1,084,381. Specification of Letters Patent. Patented Jan. 13, 1914.

Application filed January 10, 1912. Serial No. 670,465.

*To all whom it may concern:*

Be it known that I, ASAPH WOOD, a citizen of the United States, residing at Whittier, in the county of Linn and State of Iowa, have invented certain new and useful Improvements in Feed-Troughs, of which the following is a specification, reference being had to the accompanying drawings.

My invention relates to new and useful improvements in feed troughs and has for its object to provide means whereby numerous animals may eat and drink from the trough without interfering with one another.

A further object of the invention resides in providing a convoluted plate which is applied to the trough to provide substantial compartments thereon from both side edges of the same and a still further object resides in the provision of means for the hinging of said plate to the trough and the securely retaining of the same in its effective position.

A still further object resides in providing a device which is extremely simple and durable in construction, inexpensive to manufacture and one which will be very efficient and useful in operation.

With these and other objects in view my invention consists in the novel features of construction, combination and arrangement of parts, as will be hereinafter referred to and more particularly pointed out in the specification and claim.

In the accompanying drawing, forming a part of this application, Figure 1 is a perspective view of the device set up for operation; Fig. 2 is a vertical transverse section therethrough, and Fig. 3 is a fragmentary side elevation of the same showing the means for detachably retaining the convoluted plate to the trough.

Referring to the drawing, the numeral 1 designates a trough with longitudinal or side walls 2 and end walls 3 formed of metal, the trough being provided with an outstanding marginal and horizontally disposed flange, as clearly illustrated in the drawing, which serves to increase the bearing surface of the trough, assists in preventing the trough from being sunk into the ground, and by providing a ledge on which the animals may place their feet, also assists in resisting any tendency to tip the trough over. It is a well known fact that in feed troughs for animals, such as hogs and the like, a great deal of difficulty is experienced in the proper feeding of the animals, in view of the crowding and in order to prevent such crowding and to provide means whereby one animal will not interfere with another, during the feeding thereof, I provide a metallic convoluted plate 4, the convolutions of which are of a width equal to the width of the trough proper. This plate is adapted to rest on the upper edges of the sides of said trough so as to provide a plurality of compartments which may be entered from both sides of the trough and each convolution is provided at one end thereof with an eye or the like 5, which is loosely engaged with a staple 6, secured to the one side of the trough. This provides a hinging means between the trough and the plate, so that said plate may be raised from its resting position on the upper edges of the trough to permit the trough proper to be cleaned when desired and in order to provide a means for the retaining of said plate 4 in its effective position, hooks 7 are provided on the opposite ends of certain convolutions, said hooks being adapted to engage eyes 8 on the side of the trough, opposite that having the eyes 6 thereon.

It is to be noted that the two series of feeding compartments alternating with each other on the opposite sides of the trough, are entirely unobstructed, top and bottom, whereby the animals may freely raise their heads without any liability of tipping the feeding device over and that these compartments are formed of a single metallic strip bent into the shape shown to provide solid and vertically disposed partition walls dividing one compartment from the one next, whereby an animal on one side will be prevented from interfering with an animal opposite to it.

From the above description of the construction it will be seen that the convoluted plate, when properly applied to the trough, will divide the trough into certain compartments which may be entered from both sides of the device, thereby preventing the animals from interfering with one another while feeding. Furthermore it will be seen that the device being merely hingedly carried on the trough may be readily raised to clean the trough proper and thereby provide a perfectly sanitary device throughout the use thereof and it will still further be seen that by providing the hooks and eyes, as described, the convoluted plate will be retained in its natural position, without casual disengagement. It will still further be seen that my device is one which is very simple and durable in construction, inexpensive to manufacture and one which will be very efficient and useful in operation. It will also be seen that this device is an extremely sanitary one, since the provision of the plate 4 will not permit the animals to introduce their feet into the feeding trough, as is so natural with hogs.

Having thus described my invention, what I claim is:

A device of the character described, comprising a trough formed with an outstanding horizontally disposed base flange designed to provide an increased bearing surface for the trough, and a single strip of metal bent into convoluted form and adapted to rest with one edge upon the upper edge of the trough and embodying a plurality of obliquely disposed and vertically extending solid partition walls, the spaces between the walls being entirely free and unobstructed in an upward direction, said strip being pivotally connected to one side of the trough, and means for detachably connecting the other side of the trough to the strip, as and for the purpose set forth.

In testimony whereof I hereunto affix my signature in the presence of two witnesses.

ASAPH WOOD.

Witnesses:
 FRANK C. PEARSON,
 MAYE C. CARRIS.

Copies of this patent may be obtained for five cents each, by addressing the "Commissioner of Patents, Washington, D. C."